(12) United States Patent
Wong et al.

(10) Patent No.: US 10,150,573 B2
(45) Date of Patent: Dec. 11, 2018

(54) METHODS AND APPARATUS FOR PRESENTING AUTOMATIC FLIGHT CONTROL SYSTEM DATA ONBOARD AN AIRCRAFT

(71) Applicant: HONEYWELL INTERNATIONAL INC., Morris Plains, NJ (US)

(72) Inventors: Jonathan Matthew Wong, Albuquerque, NM (US); Justin Ryan, Albuquerque, NM (US); Dave Gribble, Rio Rancho, NM (US); Stephen Daniel Kropp, Albuquerque, NM (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 60 days.

(21) Appl. No.: 15/397,843

(22) Filed: Jan. 4, 2017

(65) Prior Publication Data
US 2018/0186467 A1    Jul. 5, 2018

(51) Int. Cl.
*B65D 45/00* (2006.01)
*G05D 1/00* (2006.01)
*G05D 1/08* (2006.01)
*B64D 45/00* (2006.01)

(52) U.S. Cl.
CPC ........... *B64D 45/00* (2013.01); *G05D 1/0088* (2013.01); *G05D 1/0808* (2013.01)

(58) Field of Classification Search
CPC ..... B64D 45/00; G05D 1/0088; G05D 1/0808
USPC .......................................................... 701/11
See application file for complete search history.

(56) References Cited

U.S. PATENT DOCUMENTS

| | | | |
|---|---|---|---|
| 6,405,107 B1 * | 6/2002 | Derman | G01C 21/005 340/3.5 |
| 7,188,007 B2 | 3/2007 | Boorman et al. | |
| 7,191,406 B1 * | 3/2007 | Barber | G01C 23/00 701/11 |
| 9,126,694 B2 | 9/2015 | Chandrashekarappa et al. | |
| 9,132,913 B1 | 9/2015 | Shapiro et al. | |
| 9,587,961 B2 * | 3/2017 | Toumazet | B64D 45/00 |
| 9,916,764 B2 * | 3/2018 | Shipley | G08G 5/0091 |
| 9,949,228 B2 * | 4/2018 | Skaaksrud | H04W 12/06 |
| 2013/0027226 A1 * | 1/2013 | Cabos | G08G 5/0013 340/961 |
| 2013/0076540 A1 * | 3/2013 | McLoughlin | B64D 45/00 340/945 |
| 2014/0283141 A1 * | 9/2014 | Shepherd | G06F 3/0482 726/30 |

(Continued)

*Primary Examiner* — Atul Trivedi
(74) *Attorney, Agent, or Firm* — Lorenz & Kopf, LLP (57) ABSTRACT

A method for presenting flight control system data onboard an aircraft is provided. The method detects a current operating mode of an automatic flight control system; determines a current aircraft operation, based on the current operating mode; identifies, based on the current aircraft operation, potential aircraft operations associated with a plurality of operating modes of the automatic flight control system, and wherein the plurality of operating modes comprises the current operating mode; presents, via a display device onboard the aircraft, a first plain-text description of the current operating mode and the current aircraft operation; and presents, via the display device, a plurality of plain-text descriptions, wherein each of the plain-text descriptions is associated with a respective one of the potential aircraft operations.

14 Claims, 4 Drawing Sheets

(56) References Cited

U.S. PATENT DOCUMENTS

| | | | |
|---|---|---|---|
| 2014/0309821 A1* | 10/2014 | Poux | G08G 5/0021 701/14 |
| 2015/0019048 A1* | 1/2015 | Krishna | B64D 45/00 701/4 |
| 2015/0045989 A1* | 2/2015 | Polansky | B64D 45/00 701/2 |
| 2015/0054663 A1* | 2/2015 | Pennell | B64D 45/00 340/967 |
| 2015/0261379 A1* | 9/2015 | Kneuper | G08G 5/0052 345/173 |
| 2015/0356873 A1* | 12/2015 | Kneuper | G08G 5/0021 701/439 |
| 2016/0052641 A1* | 2/2016 | Olofinboba | G08G 5/0013 340/978 |
| 2016/0229554 A1* | 8/2016 | Kawalkar | G01C 23/005 |
| 2017/0270806 A1* | 9/2017 | Shipley | G08G 5/0091 |
| 2018/0061243 A1* | 3/2018 | Shloosh | G08G 5/0013 |

* cited by examiner

METHODS AND APPARATUS FOR PRESENTING AUTOMATIC FLIGHT CONTROL SYSTEM DATA ONBOARD AN AIRCRAFT

TECHNICAL FIELD

Embodiments of the subject matter described herein relate generally to presenting data associated with operation of an automatic flight control system onboard an aircraft. More particularly, embodiments of the subject matter relate to presenting text representations of anticipated aircraft operations based on current aircraft operations.

BACKGROUND

An automatic flight control system, or "autopilot" is commonly used onboard aircraft. Operations of the automatic flight control system are associated with various modes. Modes are found in almost every supervisory control system. A mode is defined as a manner of behaving. Mode confusion is increasingly becoming a significant contributor to accidents and incidents onboard aircraft. Mode display for an automatic flight control system has traditionally included technical, abbreviated, and/or ambiguous messages to present a current state of the autopilot, which may be misinterpreted or overlooked by flight crew members, especially in times of high crew workload. Misinterpretation of automatic flight control system operations can lead to an incorrect configuration of the automatic flight control system by flight crew members, resulting in the aircraft performing unexpected or incorrect flight maneuvers. This scenario can lead to a loss of situational awareness as well as a reduction of safety margins within the air traffic control system.

Accordingly, it is desirable to provide increased situational awareness to flight crew members onboard an aircraft, as it relates to the use of an automatic flight control system. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for presenting flight control system data onboard an aircraft is provided. The method detects a current operating mode of an automatic flight control system; determines a current aircraft operation, based on the current operating mode; identifies, based on the current aircraft operation, potential aircraft operations associated with a plurality of operating modes of the automatic flight control system, and wherein the plurality of operating modes comprises the current operating mode; presents, via a display device onboard the aircraft, a first plain-text description of the current operating mode and the current aircraft operation; and presents, via the display device, a plurality of plain-text descriptions, wherein each of the plain-text descriptions is associated with a respective one of the potential aircraft operations.

Some embodiments of the present disclosure provide a system for presenting flight control system data onboard an aircraft. The system includes: a system memory element; a flight control system, configured to operate according to a current operating mode of the aircraft; a display device, configured to present graphical elements and text onboard the aircraft; and at least one processor communicatively coupled to the system memory element, the flight control system, and the display device, the at least one processor configured to: identify the current operating mode of the aircraft; determine a current aircraft operation, based on the current operating mode; identify, based on the current aircraft operation, potential aircraft operations associated with a plurality of operating modes of the flight control system, and wherein the plurality of operating modes comprises the current operating mode; and present, via the display device, a plurality of plain-text descriptions, wherein each of the plain-text descriptions is associated with a respective one of the potential aircraft operations.

Some embodiments of the present disclosure provide a non-transitory, computer-readable medium containing instructions thereon, which, when executed by a processor, perform a method. Based on a current operation of an automatic flight control system of an aircraft, the method identifies one or more potential next operations in sequence for the automatic flight control system of the aircraft; and presents, via an aircraft onboard display device, text descriptions of the one or more potential next operations.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to apparatus and methods for presenting automatic flight control system (i.e., "autopilot") data onboard an aircraft. More specifically, the subject matter relates to providing dynamic information about what the autopilot will do if an autopilot mode selection is made, prior to the selection, thereby reducing the chance of inadvertent autopilot mode engagement. Embodiments of the present disclosure accomplish this objective by presenting plain-text representations of autopilot modes and operations via an aircraft display, such that flight crew members can easily recognize, interpret, and understand current and potential autopilot operations and modes.

Certain terminologies are used with regard to the various embodiments of the present disclosure. In the context of an automatic flight control system, an operating mode is a crew-selectable function, such as "altitude hold", "climb via vertical speed to selected altitude", "heading hold", "follow navigation", or the like. Each operating mode is associated with one or more aircraft operations, such as controlling pitch, roll, yaw, departure, en route climb or descent, or approach. A plain-text representation of an aircraft operation or mode is an English-language, text description of the aircraft operation, which is presented in sentence form. Plain-text representations do not include aviation jargon, aviation acronyms, aviation abbreviations, and other abbreviated, ambiguous, and/or easily confused representations of potential and current aircraft operations.

Figure 1:
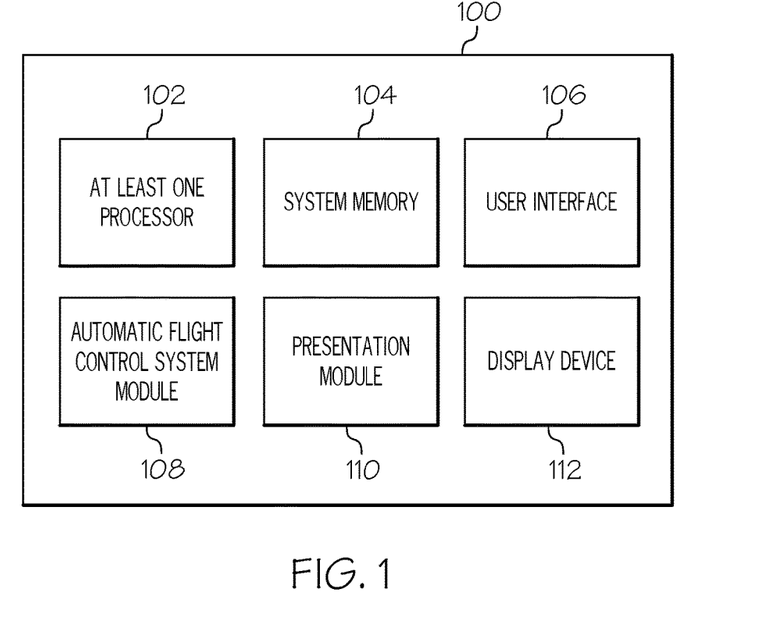
FIG. 1 is a functional block diagram of an automatic flight control system, in accordance with the disclosed embodiments.

Turning now to the figures, FIG. 1 is a functional block diagram of an automatic flight control system 100, in accordance with the disclosed embodiments. The automatic flight control system 100 is generally implemented onboard an aircraft. In this scenario, the aircraft may be any aviation vehicle that includes an automatic flight control system 100 (i.e., an "autopilot"), as described below. The aircraft may be implemented as an airplane, helicopter, spacecraft, hovercraft, unmanned aircraft, or the like. The automatic flight control system 100 is used to help automate the process of guiding and controlling the aircraft. The automatic flight control system 100 is used by the flight crew to reduce workload, and may be used to control the aircraft path in the lateral (left/right) and/or vertical (up/down) directions. The automatic flight control system 100 may include one or more aircraft-specific modes that are optimized to enable the crew to operate the aircraft efficiently within the National Airspace System.

The automatic flight control system 100 generally includes, without limitation: at least one processor 102; a system memory 104 element; a user interface 106; an automatic flight control system module 108; a presentation module 110; and a display device 112. These elements and features of the automatic flight control system 100 may be operatively associated with one another, coupled to one another, or otherwise configured to cooperate with one another as needed to support the desired functionality—in particular, to present automatic flight control system data, as described herein. For ease of illustration and clarity, the various physical, electrical, and logical couplings and interconnections for these elements and features are not depicted in FIG. 1. Moreover, it should be appreciated that embodiments of the automatic flight control system 100 will include other elements, modules, and features that cooperate to support the desired functionality. For simplicity, FIG. 1 only depicts certain elements that relate to the automatic flight control system data presentation techniques described in more detail below.

The at least one processor 102 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 102 may be realized as one or more microprocessors, controllers, microcontrollers, or state machines. Moreover, the at least one processor 102 may be implemented as a combination of computing devices, e.g., a combination of digital signal processors and microprocessors, a plurality of microprocessors, one or more microprocessors in conjunction with a digital signal processor core, or any other such configuration.

The at least one processor 102 communicates with a system memory 104 element. The system memory 104 may be realized using any number of devices, components, or modules, as appropriate to the embodiment. Moreover, the automatic flight control system 100 could include system memory 104 integrated therein and/or system memory 104 operatively coupled thereto, as appropriate to the particular embodiment. In practice, the system memory 104 could be realized as RAM memory, flash memory, EPROM memory, EEPROM memory, registers, a hard disk, a removable disk, or any other form of storage medium known in the art. In certain embodiments, the system memory 104 includes a hard disk, which may also be used to support functions of the automatic flight control system 100. The system memory 104 can be coupled to the at least one processor 102 such that the at least one processor 102 can read information from, and write information to, the system memory 104. In the alternative, the system memory 104 may be integral to the at least one processor 102. As an example, the at least one processor 102 and the system memory 104 may reside in a suitably designed application-specific integrated circuit (ASIC).

The user interface 106 may include or cooperate with various features to allow a user to interact with the automatic flight control system 100 components onboard the aircraft. Accordingly, the user interface 106 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the automatic flight control system 100. For example, the user interface 106 could be manipulated by an operator to set a desired parameter, or in other words, a desired value for which a user wishes to receive continuous updates during operation of the automatic flight control system 100, as described herein.

In certain embodiments, the user interface 106 may include or cooperate with various features to allow a user to interact with the automatic flight control system 100 via graphical elements rendered on a display device 112. Accordingly, the user interface 106 may initiate the creation, maintenance, and presentation of a graphical user interface (GUI). In certain embodiments, the display device 112 implements touch-sensitive technology for purposes of interacting with the GUI. Thus, a user can manipulate the GUI by moving a cursor symbol rendered on the display device 112, or by physically interacting with the display device 112 itself for recognition and interpretation, via the user interface 106.

The automatic flight control system module 108 is configured to perform operations associated with guiding and controlling the aircraft. The automatic flight control system module 108 is configured to obtain avionics data indicating aircraft parameters, aircraft position, flight plans, navigation system data, and user input (via the user interface 106). The automatic flight control system module 108 is configured to operate by receiving user-entered data, including, without limitation: (1) user-entered modes (lateral and vertical); (2)

user-entered targets (e.g., altitude, vertical speed, indicated airspeed); and (3) user-entered engagement controls (e.g., AP, YD, FD). The automatic flight control system module 108 uses the obtained avionics data and user input to generate guidance cues, to identify appropriate aircraft operations to comply with the guidance cues, and to execute these operations when user input selections or system commands are received. When inappropriate aircraft operations are identified, the automatic flight control module 108 is configured to return control to the user, but also continues to generate guidance cues.

The presentation module 110 identifies and presents (via the display device 112) appropriate graphical elements and/or plain-text representations for potential operations determined by the automatic flight control system module 108. Graphical elements may include symbols indicating a current, anticipated or potential direction of travel or course change for the aircraft. Plain-text representations include English-language, succinct, text descriptions of potential or anticipated aircraft operations presented in sentence form and/or in a form that is easily understood by the user. In certain embodiments, plain-text representations avoid the use of aviation jargon, aviation acronyms, aviation abbreviations, and other cryptic, ambiguous, and/or easily confused representations of potential, anticipated, and current aircraft operations. In some embodiments, the plain-text representations do not include aviation jargon, aviation acronyms, aviation abbreviations, or the like. The presentation module 110 presents the plain-text representations for: (1) autopilot mode status annunciation, wherein the plain text augments or replaces the traditional acronym based mode annunciators (like HDG, VS, ALT); and (2) engagement confirmation, wherein a plain-text sentence is used to communicate to the flight crew the next or subsequent action/operation of the aircraft, based on current aircraft status and user input selections.

In practice, the automatic flight control system module 108 and the presentation module 110 may be implemented with (or cooperate with) the at least one processor 102 to perform at least some of the functions and operations described in more detail herein. In this regard, the automatic flight control system module 108 and the presentation module 110 may be realized as suitably written processing logic, application program code, or the like.

The display device 112 is configured to present graphics, text, and any type of visual representation of automatic flight control system 100 data. More specifically, the display device 112 presents graphical elements and plain-text representations associated with aircraft modes and operations. The display device 112 may be realized as an electronic display configured to graphically display automatic flight control system 100 data. In an exemplary embodiment, the display device 112 is located within a cockpit or flight deck of the aircraft. It will be appreciated that although certain embodiments of the automatic flight control system 100 use a single display device 112, in other embodiments, additional display devices 112 may be present onboard the aircraft. In some embodiments, the display device 112 and/or user interface 106 may be located outside the aircraft (e.g., on the ground as part of an air traffic control center or another command center) and communicatively coupled to the remaining elements of the automatic flight control system 100 (e.g., via a data link).

Figure 2A:
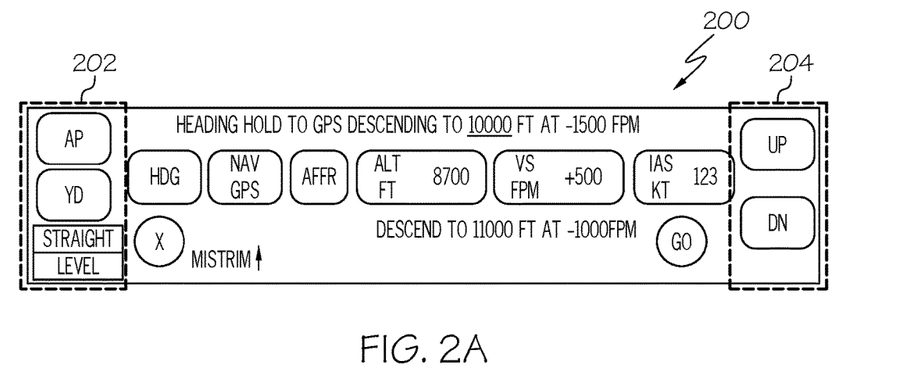
FIGS. 2A-2C are diagrams an automatic flight control system user interface, in accordance with the disclosed embodiments.
Figure 2B:
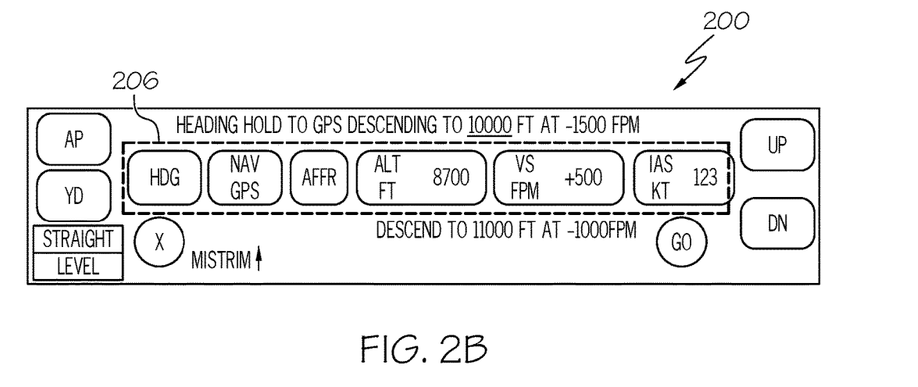
Figure 2C:
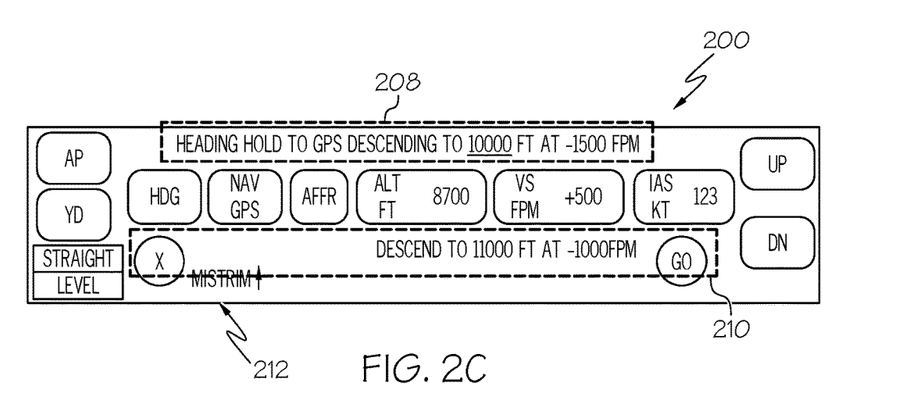

FIGS. 2A-2C are diagrams of an embodiment of an automatic flight control system user interface 200, which is generally implemented as a graphical user interface (GUI) presented by an aircraft onboard display device. It should be appreciated that FIGS. 2A, 2B, and 2C depict a simplified embodiment of the automatic flight control system user interface, and that some implementations of the automatic flight control system user interface may include additional elements or components.

FIG. 2A illustrates a set of engagement controls 202 and a set of vertical controls 204 of the automatic flight control system user interface 200. In this embodiment, the engagement controls 202 are located on the left side of the automatic flight control system user interface 200. The engagement controls 202 are used to engage and/or disengage the automatic flight control system (i.e., the autopilot), the yaw damper, or to engage/disengage the straight and level mode. In some embodiments, the "YD" engagement control 202 is replaced with an altimeter control configured to receive user input Baro values. Certain embodiments of the engagement controls 202 use touch controls, and touching an engagement control 202 for a period of time longer than a threshold may be required to prevent inadvertent activation or deactivation. The vertical controls 204 are located on the right side of the automatic flight control system user interface 200. The vertical controls 204 are used to adjust the altitude preselect, or the vertical speed (VS) and indicated airspeed (IAS) targets. The vertical controls 204 may also be used to change the current aircraft altitude when the automatic flight control system (i.e., the "autopilot") is in Altitude Hold (ALT) mode. In some embodiments, the vertical controls 204 may be implemented using touch controls, touch/swipe controls, dual concentric knobs, physical buttons, rocker switches, or wheels. In some embodiments, the vertical controls 204 may be implemented using voice controls, gaze controls, or the like.

FIG. 2B illustrates a set of mode controls 206 of the automatic flight control system user interface 200. In this embodiment, the mode controls 206 are located in the center of the automatic flight control system user interface 200. The mode controls 206 are generally used in conjunction with execution controls 210 to change autopilot lateral modes such as heading (HDG), approach (APPR) or autopilot vertical modes such as altitude (ALT), vertical speed (VS), or indicated airspeed (IAS). Each of the mode controls 206 provides dynamic information about what the autopilot will do if the button is pressed. Providing this information prior to the selection of any autopilot mode should reduce the chance of inadvertent autopilot mode engagement. When any of the mode controls 206 are selected by a user, the automatic flight control system user interface 200 presents the execution display and controls 210. The execution display provides a plain text description of the selected autopilot mode. The execution controls 210 allow the crew to either accept or reject the new autopilot mode. The mode controls 206 are generally implemented using touch controls or, in other words, a touch screen that includes user-selectable options.

FIG. 2C illustrates an autopilot status display 208, the previously-referenced execution display and controls 210, and error messages 212. As shown, the autopilot status display 208 is located at the top of the automatic flight control system user interface 200, the execution display and controls 210 at the bottom of the automatic flight control system user interface 200, and the error messages 212 on the bottom-left side of the automatic flight control system user interface 200.

The autopilot status display 208 provides plain-text descriptions and/or graphical elements of a current aircraft mode or aircraft operation that is in the process of being performed by the automatic flight control system. In certain embodiments, the autopilot status display 208 includes one or more data fields that may be changed, based on user input selections of the vertical controls 204.

In this particular embodiment, the execution display and controls 210 includes (1) an execution display that shows, using graphical elements and/or plain-text descriptions, operations that the automatic flight control system will execute if (2) an execution control is activated. The execution display and controls 210 may include one or more fields that may be changed based on user input to the vertical controls 204. In the embodiment shown, the execution controls include a "GO" command and a cancel control ("X") which function to change an active autopilot mode or abort the change, based on user input. The execution controls provide a two-step positive method to review and execute autopilot commands, which reduces logical errors and eliminates accidental touch activations. Also as shown, the error messages 212 present persistent messages regarding degraded states of the automatic flight control system.

Figure 3:
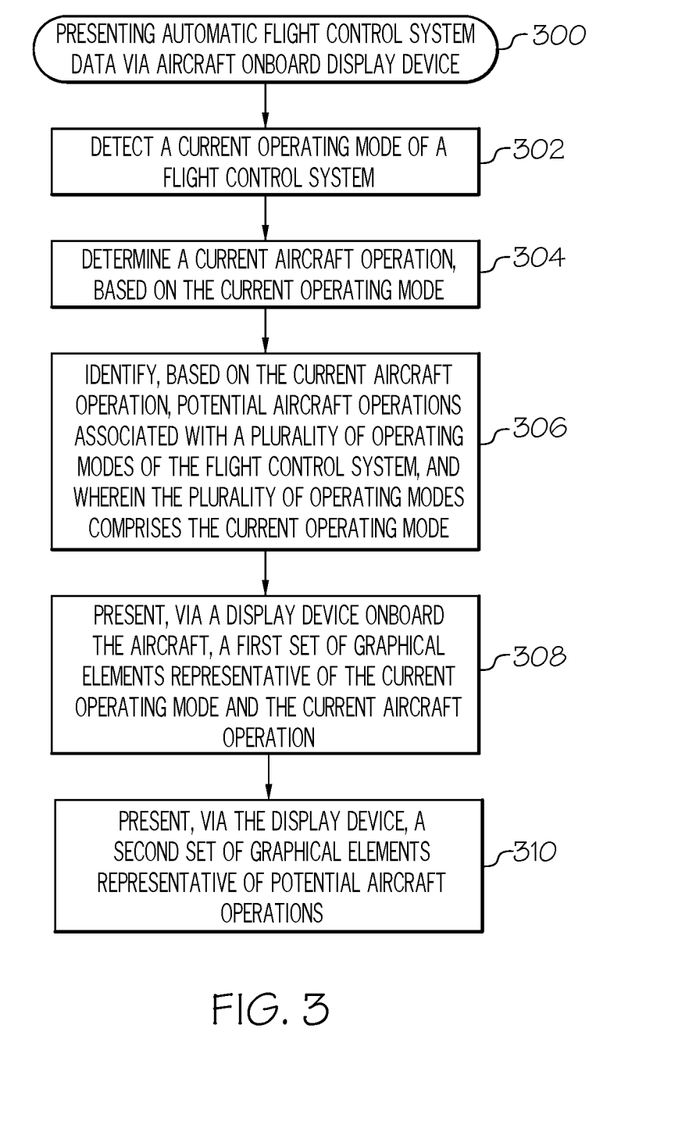
FIG. 3 is a flow chart that illustrates an embodiment of a process for presenting automatic flight control system data.

FIG. 3 is a flow chart that illustrates an embodiment of a process 300 for presenting automatic flight control system data. The automatic flight control system data is presented onboard an aircraft, via a display device, during operation of the automatic flight control system. For ease of description and clarity, it is assumed that this example begins by detecting a current operating mode of a flight control system (step 302). An autopilot operating mode is the crew or system selected method of operation by which the autopilot is controlling the lateral and/or vertical axis of the aircraft. As a lateral example, heading (HDG) mode is a method by which the autopilot maneuvers the aircraft to maintain a selected magnetic heading. As a vertical example, altitude (ALT) mode is a method by which the autopilot maneuvers the aircraft to maintain a selected barometric altitude.

Next, the process 300 determines a current aircraft operation, based on the current operating mode (step 304). Each operating mode is associated with one or more aircraft operations, such as climbing, descending, turning left, turning right, etc. As a lateral example, if the autopilot is in heading "HDG" mode, and the aircraft is flying North, and the selected heading is East, then the autopilot will command a right hand turn.

The process 300 then identifies, based on the current aircraft operation, potential aircraft operations associated with a plurality of operating modes of the flight control system, and wherein the plurality of operating modes comprises the current operating mode (step 306). One suitable methodology for identifying potential aircraft operations is described below with reference to FIG. 4. A potential aircraft operation is an aircraft operation that could feasibly execute immediately following performance of the current aircraft operation, wherein the current aircraft operation and the potential aircraft operation may be executed sequentially, wherein the current aircraft operation is a first operation in a sequence and the potential aircraft operation is a second operation in sequence, and wherein the potential aircraft operation is executed after performance of the current aircraft operation is complete. As one example, an aircraft may climb, at a constant vertical speed (VS), to a selected altitude. When the aircraft reaches the selected altitude, the autopilot transitions from VS mode to Altitude Hold (ALT) mode, permitting the aircraft to level off at the selected altitude. In this particular example, while the aircraft is climbing to the selected altitude, the current operation is the VS mode, and the potential aircraft operation is ALT mode.

Next, the process 300 presents, via a display device onboard the aircraft, a first set of graphical elements representative of the current operating mode and the current aircraft operation (step 308). The process 300 also presents, via the display device, a second set of graphical elements associated with potential operations of the aircraft (step 310). The first and second sets of graphical elements may include any representation of current and potential aircraft modes and/or operations, including but not limited to: plain-text descriptions of current aircraft operations, a left/right arrow or other graphics indicating a current or potential aircraft lateral direction, or and up/down arrow or other graphics indicating a current or potential aircraft vertical direction. Other graphical elements may include a combination of text and symbols that are commonly used by automatic flight control systems and/or in the field of aviation. In addition, plain text descriptions denoting any limitations of the system may also be included.

A plain-text description or representation is an English-language, text description of an aircraft operation, which is presented in sentence form. Plain-text representations do not include aviation jargon, aviation acronyms, aviation abbreviations, and other cryptic, ambiguous, and/or easily confused representations of potential and current aircraft operations. In certain embodiments, the process 300 displays a plain-text description of the current operating mode and the current aircraft operation such that a flight crew member can easily recognize aircraft operations that are in progress, and the aircraft mode associated with these operations that are being performed. Additionally, the process 300 displays a plain-text description of potential aircraft operations such that a flight crew member may view and easily recognize the aircraft behavior that would result from a particular user selection. The process 300 functions to present easily recognizable and understandable indications of results that occur in response to user selections for the automatic flight control system.

In other embodiments, the first set of graphical elements comprise an arrow indicating a current direction of aircraft travel, and a second set of graphical elements that include arrows indicating potential aircraft turns or directions of travel that would result from a particular user selection.

Figure 4:
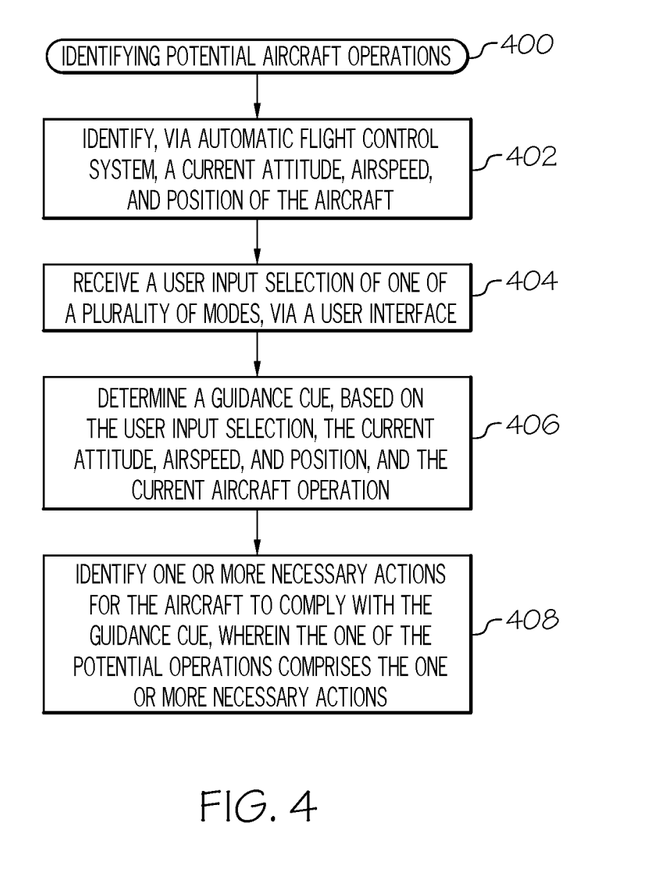
FIG. 4 is a flow chart that illustrates an embodiment of a process for identifying potential aircraft operations.

FIG. 4 is a flow chart that illustrates an embodiment of a process 400 for identifying potential aircraft operations. It should be appreciated that the process 400 described in FIG. 4 represents one embodiment of step 306 described above in the discussion of FIG. 3, including additional detail.

First, the process 400 identifies, via the automatic flight control system, a current attitude, airspeed, and position of the aircraft (step 402). Here, the process 400 obtains the current state of the aircraft from the automatic flight control system, which includes attitude (i.e., an orientation of the aircraft relative to Earth's horizon), airspeed (e.g., indicated airspeed, calibrated airspeed, true airspeed, equivalent airspeed, and/or density airspeed), and a lateral and/or vertical position of the aircraft.

Next, the process 400 receives a user input selection of one of a plurality of modes, via a user interface (step 404). The aircraft is generally operating according to a current mode, and the user (e.g., flight crew member) provides a selection of a second aircraft operating mode that is associated with performance of one or more particular functions of the aircraft. The process 400 then determines a guidance cue, based on the user input selection; the current attitude, airspeed, and position; and the current aircraft operation (step 406). Next, the process 400 identifies one or more necessary actions for the aircraft to comply with the guidance cue, wherein the one of the potential operations comprises the one or more necessary actions (step 408).

The various tasks performed in connection with processes 300-400 may be performed by software, hardware, firmware, or any combination thereof. For illustrative purposes, the preceding descriptions of processes 300-400 may refer to elements mentioned above in connection with FIGS. 1 and 2A-2C. In practice, portions of processes 300-400 may be performed by different elements of the described system. It should be appreciated that processes 300-400 may include any number of additional or alternative tasks, the tasks shown in FIGS. 3-4 need not be performed in the illustrated order, and processes 300-400 may be incorporated into a more comprehensive procedure or process having additional functionality not described in detail herein. Moreover, one or more of the tasks shown in FIGS. 3-4 could be omitted from one or more embodiments of the processes 300-400 as long as the intended overall functionality remains intact.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIG. 1 depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for presenting flight control system data onboard an aircraft, the method comprising:

detecting a current operating mode of an automatic flight control system, the current operating mode comprising a currently-selected method of operation for autopilot to control at least one of a lateral axis and a vertical axis of the aircraft, wherein the automatic flight control system comprises the autopilot;

determining a current aircraft operation, based on the current operating mode, wherein the current aircraft operation comprises at least one of climbing, descending, and turning, and wherein each operating mode of the autopilot is associated with one or more aircraft operations;

identifying, based on the current aircraft operation, a potential aircraft operation associated with one of a plurality of operating modes of the automatic flight control system, by:

identifying a current attitude and position of the aircraft, via the automatic flight control system;

receiving a user input selection of the one of the plurality of operating modes, via a user interface;

determining a guidance cue based on the user input selection, the current attitude and position, and the current aircraft operation; and identifying one or more necessary actions for the aircraft to comply with the guidance cue, wherein the potential aircraft operation comprises the one or more necessary actions, and wherein the current aircraft operation and the potential aircraft operation are configured to execute sequentially to comply with the guidance cue;

presenting an autopilot mode status annunciation comprising a first plain-text description of the current operating mode and the current aircraft operation, via a display device onboard the aircraft, wherein the first plain-text description augments a traditional acronym-based mode annunciator; and in response to receiving the user input selection, presenting an engagement confirmation comprising a second plain-text description associated with the potential aircraft operation, via the display device, wherein the second plain-text description communicates that the potential aircraft operation is a next operation in sequence subsequent to the current aircraft operation;

wherein the autopilot mode status annunciation and the engagement confirmation comprise English-language text in sentence form, and wherein the autopilot mode status annunciation and the engagement confirmation do not include aviation jargon, aviation acronyms, or aviation abbreviations.

2. The method of claim 1, further comprising:
establishing a communication connection to the automatic flight control system onboard an aircraft; and
detecting the current operating mode via the communication connection.

3. The method of claim 1, wherein the display device comprises a touch-screen control user interface; and
wherein the method further comprises:
receiving a user input selection of one of a plurality of operating modes for the automatic flight control system, wherein the one of the plurality of operating modes is associated with the current operation; and
identifying the current operation based on the user input selection, wherein the current operation is associated with a current operating mode, and wherein the plurality of operating modes comprises the current operating mode.

4. The method of claim 3, further comprising:
presenting one of the text descriptions in close proximity to an associated user selectable option, via the touch-screen control user interface; and
wherein the associated user selectable option represents the current operating mode.

5. A system for presenting flight control system data onboard an aircraft, the system comprising:
a system memory element;
a flight control system, configured to operate according to a current operating mode of the aircraft;
a display device, configured to present graphical elements and text onboard the aircraft; and
at least one processor communicatively coupled to the system memory element, the flight control system, and the display device, the at least one processor configured to:

identify the current operating mode of the aircraft, the current operating mode comprising a currently-selected method of operation for autopilot to control at least one of a lateral axis and a vertical axis of the aircraft, wherein the flight control system comprises the autopilot;

determine a current aircraft operation, based on the current operating mode, wherein the current aircraft operation comprises at least one of climbing, descending, and turning, and wherein each operating mode of the autopilot is associated with one or more aircraft operations;

identify, based on the current aircraft operation, a potential aircraft operation associated with one of a plurality of operating modes of the flight control system, by:

identifying a current attitude and position of the aircraft, via the flight control system;

receiving a user input selection of the one of the plurality of operating modes, via a user interface;

determining a guidance cue based on the user input selection, the current attitude and position, and the current aircraft operation; and identifying one or more necessary actions for the aircraft to comply with the guidance cue, wherein the potential aircraft operation comprises the one or more necessary actions, and wherein the current aircraft operation and the potential aircraft operation are configured to execute sequentially to comply with the guidance cue;

present an autopilot mode status annunciation comprising a first plain-text description of the current operating mode and the current aircraft operation, via the display device, wherein the first plain-text description augments a traditional acronym-based mode annunciator; and in response to receiving the user input selection, present an engagement confirmation comprising a second plain-text description associated with the potential aircraft operation, via the display device, wherein the second plain-text description communicates that the potential aircraft operation is a next operation in sequence subsequent to the current aircraft operation;

wherein the autopilot mode status annunciation and the engagement confirmation comprise English-language text in sentence form, and wherein the autopilot mode status annunciation and the engagement confirmation do not include aviation jargon, aviation acronyms, or aviation abbreviations.

6. The system of claim 5, further comprising:
a touch-screen control user interface, configured to receive user input selections of one of a plurality of operating modes for the flight control system, wherein the plurality of operating modes comprises the current operating mode;
wherein the at least one processor is further configured to identify the current operating mode based on one of the user input selections.

7. The system of claim 6, wherein the at least one processor is further configured to present one of the plurality of plain-text descriptions in close proximity to an associated user selectable option; and
wherein the associated user selectable option represents the one of the plurality of operating modes.

8. The system of claim 5, wherein the current operating mode comprises one of a lateral mode and a vertical mode.

9. A non-transitory, computer-readable medium containing instructions thereon, which, when executed by a processor, perform a method comprising:
based on a current operating mode of an automatic flight control system of an aircraft, and a current aircraft operation,
identifying a potential next operation in sequence for the automatic flight control system of the aircraft, by:
identifying a current attitude and position of the aircraft, via the automatic flight control system;
receiving a user input selection of a second operating mode, via a user interface;
determining a guidance cue based on the user input selection, the current attitude and position, and the current aircraft operation; and
identifying one or more necessary actions for the aircraft to comply with the guidance cue, wherein the potential aircraft operation comprises the one or more necessary actions, and wherein the current aircraft operation and the potential next operation are configured to execute sequentially to comply with the guidance cue;
wherein the current operating mode comprises a currently-selected method of operation for autopilot to control at least one of a lateral axis and a vertical axis of the aircraft, wherein the automatic flight control system comprises the autopilot;
wherein the current aircraft operation comprises at least one of climbing, descending, and turning, and wherein each operating mode of the autopilot is associated with one or more aircraft operations;
presenting an autopilot mode status annunciation comprising a first plain-text description of the current operating mode and the current aircraft operation, via a display device onboard the aircraft, wherein the first plain-text description augments a traditional acronym-based mode annunciator; and
in response to receiving the user input selection, presenting a second plain-text description of the potential next operation, via the display device, wherein the second plain-text description communicates that the potential next operation follows the current aircraft operation in sequence;
wherein the autopilot mode status annunciation and the engagement confirmation comprise English-language text in sentence form, and wherein the autopilot mode status annunciation and the engagement confirmation do not include aviation jargon, aviation acronyms, or aviation abbreviations.

10. The non-transitory, computer-readable medium of claim 9, wherein the method further comprises:
establishing a communication connection to a flight control system onboard an aircraft; and
identifying the current operation via the communication connection.

11. The non-transitory, computer-readable medium of claim 9, wherein the method further comprises identifying a current operating mode of an aircraft, via the automatic flight control system; and
wherein the current operation is determined based on the current operating mode.

12. The non-transitory, computer-readable medium of claim 11, wherein the current operating mode comprises one of a lateral mode and a vertical mode.

13. The non-transitory, computer-readable medium of claim 9, wherein the display device comprises a touch-screen control user interface; and
wherein the method further comprises:
receiving a user input selection of one of a plurality of operating modes for the flight control system, wherein the one of the plurality of operating modes is associated with the current operation; and
identifying a current operation based on the user input selection, wherein the current operation is associated with a current operating mode, and wherein the plurality of operating modes comprises the current operating mode.

14. The non-transitory, computer-readable medium of claim 13, wherein the method further comprises:
presenting one of the text descriptions in close proximity to an associated user selectable option, via the touch-screen control user interface; and
wherein the associated user selectable option represents the current operating mode.

* * * * *